(12) United States Patent
Howard et al.

(10) Patent No.: US 9,002,762 B1
(45) Date of Patent: Apr. 7, 2015

(54) SYSTEM AND METHOD FOR ADAPTIVE RECALL

(71) Applicant: HRL Laboratories, LLC, Malibu, CA (US)

(72) Inventors: Michael D. Howard, Westlake Village, CA (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 255 days.

(21) Appl. No.: 13/742,277

(22) Filed: Jan. 15, 2013

Related U.S. Application Data

(60) Provisional application No. 61/590,387, filed on Jan. 25, 2012.

(51) Int. Cl.
*G06F 12/00* (2006.01)
*G06N 3/04* (2006.01)
*G06N 3/02* (2006.01)

(52) U.S. Cl.
CPC ........ *G06F 12/00* (2013.01); *G06N 3/04* (2013.01); *G06N 3/02* (2013.01); *G06N 3/0454* (2013.01)

(58) Field of Classification Search
None
See application file for complete search history.

(56) References Cited

U.S. PATENT DOCUMENTS 7,333,963 B2   2/2008   Widrow et al.

OTHER PUBLICATIONS

Stewart, et al., A Biologically Realistic Cleanup Memory: Autoassociation in Spiking Neurons, Cognitive Systems Research, vol. 12, Issue 2, Jun. 2011, pp. 84-92.*
S. Chikkerur, T. Serre, C. Tan, and T. Poggio. An integrated model of visual attention using shape-based features. Technical Report CBCL paper 278, Massachusetts Institute of Technology, 2009.
J. J. Hopfield. Neural networks and physical systems with emergent collective computational abilities. Proceedings of the National Academy of Sciences, 79(8):2554-2558, Apr. 1982.
Javier R. Movellan. Contrastive Hebbian learning in the continuous Hopfield model. In David S. Touretzky, Jeffrey L. Elman, Terrence J. Sejnowski, and Geoffrey E. Hinton, editors, Connectionist Models: Proceedings of the 1990 Summer School, pp. 10-17, San Mateo, California, 1991. University of California at San Diego, Morgan Kaufmann Publishers, Inc.
A. Yuille and D. Geiger, Winner-Take-All Mechanisms. In: M.A. Arbib (Ed.) The Handbook of Brain Theory and Neural Networks, pp. 1056-1060, Cambridge, MA, 1995, MIT Press.

(Continued)

*Primary Examiner* — Wilbert L Starks
(74) *Attorney, Agent, or Firm* — Tope-McKay & Associates

(57) ABSTRACT

Described is a system for adaptive memory recall. The system receives original input data, then divides the original input data into multiple data groups to serve as input for a network comprising a pattern separation layer and an autoassociative memory layer. The original input data is processed with a pattern separation component of the pattern separation layer, and each pattern separation component generates an increased-contrast version of the original input data it processes. The generated increased-contrast version of the original input data is combined with the original input data and stored in an autoassociative memory component of the autoassociative memory layer for each data group. New input data is received, and a parameter that controls processing in the pattern separation layer is modulated to determine an optimal parameter, which indicates that a memory recall between the stored data and the new set of input data is achieved.

21 Claims, 7 Drawing Sheets

(56) References Cited

OTHER PUBLICATIONS

Michael D. Howard, Rajan Bhattacharyya, Randall C. O'Reilly, Giorgio Ascoli, and Jean-Marc Fellous, "Adaptive Recall in Hippocampus" pp. 151-157, DOI, 10.3233/978-1-60750-959-2-151, Frontiers in Artificial Intelligence and Applications, vol. 233: Biologically Inspired Cognitive Architectures 2011.

Thomas Serre, Lior Wolf, Stanley Bileschi, Maximilian Riesenhuber, and Tomaso Poggio. Robust object recognition with cortex-like mechanisms. IEEE Transactions on Pattern Analysis and Machine Intelligence, 29:411-426, 2007.

O'Reilly & Munakata. Computational Explorations in Cognitive Neuroscience: Understanding the Mind by Simulating the Brain, MIT Press, 2000 p. 103, section 3.5.3 is a section on "K-winners-take-all."

* cited by examiner

SYSTEM AND METHOD FOR ADAPTIVE RECALL

GOVERNMENT LICENSE RIGHTS

This invention was made with government support under U.S. Government Contract Number D10PC20021 ICArUS-MINDS (Mirroring Intelligence in a Neural Description of Sensemaking). The government has certain rights in the invention.

CROSS-REFERENCE TO RELATED APPLICATIONS

This is a Non-Provisional patent application of U.S. Provisional Application No. 61/590,387, filed in the United States on Jan. 25, 2012, titled, "System and Method for Adaptive Recall."

BACKGROUND OF THE INVENTION (1) Field of Invention

The present invention relates to a system and method for adaptive memory recall and, more particularly, to a system and method for adaptive memory recall that allows for recall of an original memory of objects when similar objects are encountered in a different context.

(2) Description of Related Art

Traditional memory stores data at a unique address and can recall the data upon presentation of the complete unique address. Traditional associative memories bind information into a single representation. For instance, data is stored based on a particular context, and the data is recalled upon presentation of that context. In contrast, autoassociative memories are capable of retrieving a piece of data upon presentation of only partial information from that piece of data. Humans can do this type of recognition and recall easily. People experience a significant set of percepts (i.e., a perceived element) in one setting, and if they encounter the same set of percepts in a different setting, they recognize them despite the environmental shift. However, machine perception systems will be confused by the context, and unable to recall the original memory.

U.S. Pat. No. 7,333,963, entitled, "Cognitive memory and auto-associative neural network based search engine for computer and network located images and photograph" (hereinafter referred to as the '963 patent) describes an auto-associative neural network that performs cued retrieval for objects in images and character recognition. However, the network described in the '963 patent does not have the facility for becoming confused when familiar objects are found in an unfamiliar context.

In "Neural Networks and Physical Systems with Emergent Collective Computational Abilities" in *Proceedings of the National Academy of Sciences*, 79(8): 2254-2558, 1982, Hopfield (hereinafter referred to as the Hopfield reference) provides a model of content-addressable memory; however, the model cannot store memories that have a Hamming distance around half the size of another memory. If memories are this similar, they tend to merge.

The Massachusetts Institute of Technology (MIT) Center for Biological and Computational Learning (CBCL) object recognition model is based on the human visual pathway, as described by Chikkerur et al. in "An Integrated Model of Visual Attention Using Shape-Based Features" in Technical Report CBCL paper 278, Massachusetts Institute of Technology, 2009. On static images, the CBCL object recognition model has been shown in extensive comparisons to perform at the level of the best computer vision systems in recognizing objects in the real world, such as cars, pedestrians, buildings, trees, and road, as described by Serre et al. in "Robust Object Recognition with Cortex-Like Mechanisms" in *IEEE Transactions on Pattern Analysis and Machine Intelligence*", 29:411-426, 2007. However, Serre et al. apply preprocessing to separate the objects from the background and then recognize objects. This means that CBCL's object recognition model gets confused by context and, in addition, it cannot retrieve the original context of the objects it has stored.

Each of the aforementioned methods exhibit limitations that make them incomplete. Thus, there is a continuing need for an approach for learning to associate significant objects encountered within a particular context with the ability to recall the original memory, even when encountered within a different context.

SUMMARY OF THE INVENTION

The present invention relates to a system for adaptive memory recall. The system comprises one or more processors and a memory having instructions such that when the instructions are executed, the one or more processors perform multiple operations. A set of original input data is received and divided into a plurality of data groups to serve as input for a network comprising a pattern separation layer and an autoassociative memory layer. The pattern separation layer comprises a plurality of pattern separation components and the autoassociative memory layer comprises a plurality of autoassociative memory components. For each data group, the original input data is processed with a distinct pattern separation component of the pattern separation layer, wherein each pattern separation component generates an increased-contrast version of the original input data it processes. For each data group, the generated increased-contrast version of the original input data from the pattern separation layer is combined with the original input data, resulting in combined input data. For each data group, the combined input data is then stored in a distinct autoassociative memory component, resulting in stored data.

In another aspect, a new set of input data is received, and at least one parameter that controls processing in the pattern separation layer is modulated to determine at least one optimal parameter, wherein if the at least one optimal parameter is determined, then a memory recall between the stored data and the new set of input data is achieved.

In another aspect, if the at least one optimal parameter is not determined, then the new set of input data is learned by the system.

In another aspect, the at least one parameter is an inhibition parameter, wherein the inhibition parameter inhibits processing in the pattern separation layer, such that inhibition of processing decreases contrast in the generated increased-contrast version of the original input data.

In another aspect, each inhibition parameter inhibits processing in a distinct pattern separation component, and wherein each inhibition parameter is modulated independently.

In another aspect, the system performs an operation of iteratively modulating the inhibition parameter using a recall confidence metric, wherein if the recall confidence metric is above a predetermined threshold, then the memory recall is achieved, and wherein if the recall confidence metric is below a predetermined threshold, then inhibition is decreased.

In another aspect, the plurality of data groups comprises an object data group and a context data group.

As can be appreciated by one skilled in the art, the present invention also comprises a method for causing a processor to perform the operations described herein.

Finally, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
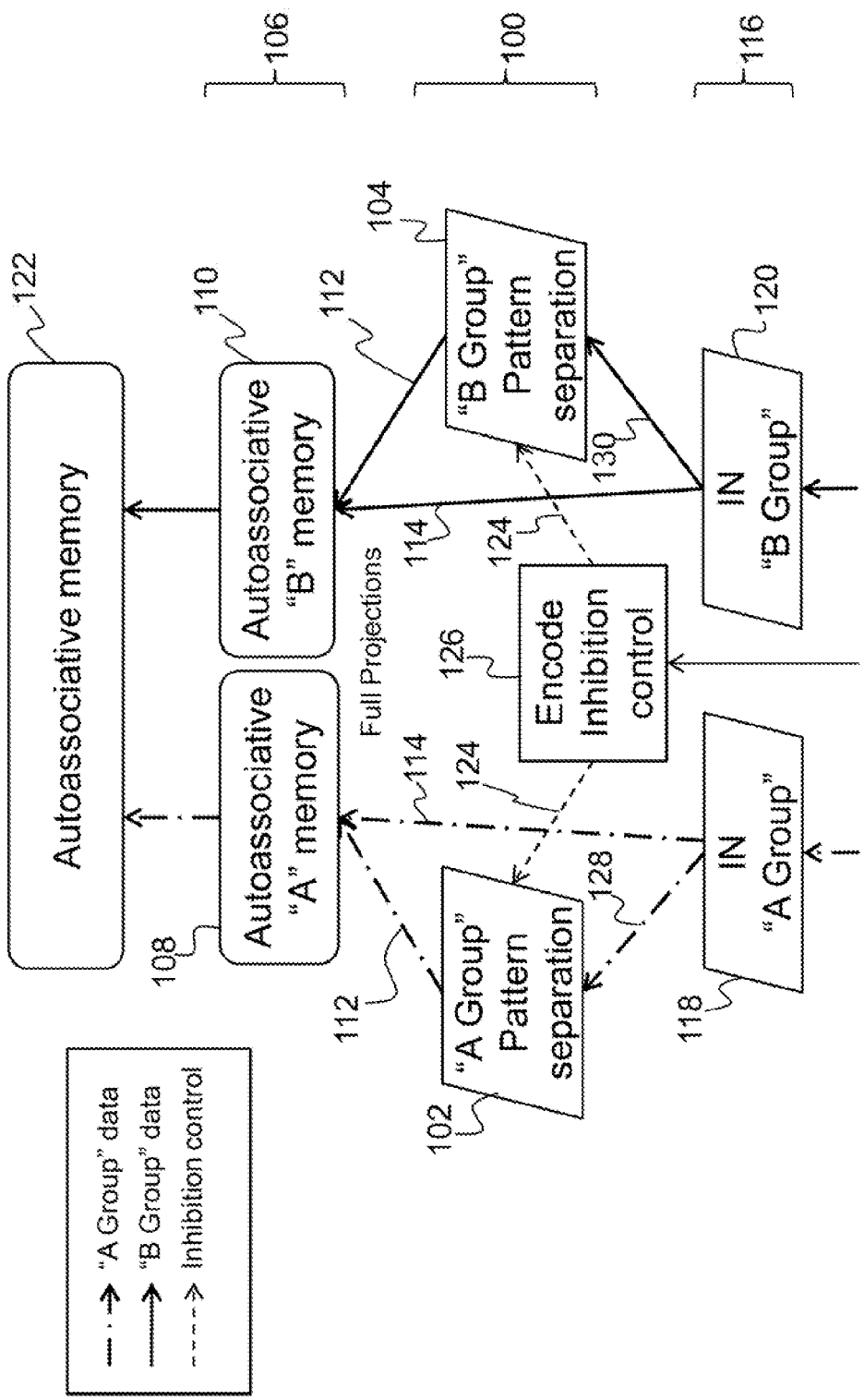
FIG. 1 is a diagram depicting a system for adaptive memory recall according to the present invention.

The present invention relates to a system and method for adaptive memory recall and, more particularly, to a system and method for adaptive memory recall that allows for recall of an original memory of objects when similar objects are encountered in a different context. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the an that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for adaptive memory recall. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for adaptive memory recall. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(2) Specific Details

The present invention provides a system, method, and computer program product to flexibly recall information from an associative memory. The flexibility refers specifically to an ability to alter the cues for recall to explore the space of stored associations between information. The technique was developed as a way to emulate the way humans cognitively analyze a scene by comparison with scenes they recall.

The general concept, which is described in detail below, binds two or more groups of data/information (i.e., the cues). As a non-limiting example, one is given two sets of data that may represent perceived objects, represented by the A data set, and their spatial context, represented by the B data set. The system can first learn to associate objects in a particular context: A+B. Then, if the same objects are encountered in a different context: A+C, the system described herein can recall A+B (i.e., the original context B where objects A occurred).

Traditional associative memories bind information into a single representation. When A+C is encountered, a traditional associative memory may not settle into the A+B memory (i.e., attractor state). In contrast, autoassociative networks will settle into different attractor states, or memories, if they are either perturbed in some fashion, or the input cue to the network is changed from one recall to the next. The present invention addresses the latter.

The invention described herein leverages separate representations before the binding occurs and alters them so they can be recalled if only one of the constituent representations is encountered. Furthermore, the approach can learn to associate the significant objects with the context in which they were encountered so that when a similar confluence of one data group is encountered again in a different context (i.e., different data group association), the system can recall the original memory. Additionally, the method can be used to detect when a recall is not successful and can iteratively change the parameters of the system to try to achieve a successful recall. Otherwise, the input will be identified as novel and may be learned. These parametric iterations involve modulating the amount of inhibition in part of the system used to match the input cue with memory.

FIG. 1 is a block diagram of the functional pieces that form the basis of the present invention. FIG. 1 illustrates a multi-layered memory system with two primary pathways associating two groups of data, an "A Group" data (e.g., object data) pathway (as indicated by the dot-dash arrows) and a "B Group" data (e.g., context data) pathway (as indicated by the solid arrows). As can be appreciated by one skilled in the art, more than two groups can also exist. Additionally, context data and object data are only examples of types of data one may want to associate, but "A Group" data and "B Group" data can be any other aspects of the inputs. Each pathway contains two components which correspond to two different layers in the implementation. A pattern separation layer 100 with an "A Group" pattern separation component 102 and a "B Group" pattern separation component 104. An autoassociative memory layer 106 with an autoassociative "A" memory component 108 and an autoassociative "B" memory component 110. In addition to inputs 112 from the pattern separation layer 100, the first autoassociative memory layer 106 also gets direct projections 114 from an input layer 116 comprising an IN "A Group" component 118 and an IN "B Group" component 120. The "A Group" and "B Group" pathways converge in an autoassociative memory 122.

As a non-limiting example, the input to the system is regular arrays of values. The values may be pixel values, but values representing any desired element are possible. Assume that each value must be in some set range that is limited by the range of values that the networks can represent. For instance, in the desired implementation of a neural network, each unit in the network would have an activation level that represents the value of the input data at that topographic location. The range of values that the unit can represent is limited by (1) the accuracy of the hardware or software system that computes and maintains the activation level of that unit and (2) the accuracy with which that activation level can be sensed.

The activity of each layer in the network (i.e., memory system) may be visualized as a flat, topographic matrix of values. Projections (as indicated by arrows) between layers are shown in FIG. 1; however, connections within layers may also exist. A non-limiting example used in the present invention is recurrent connections in the autoassociative memory layers which promote pattern completion. An example of recurrent connections, a Hopfield Network, is described in the Hopfield reference, which is hereby incorporated by reference as though fully set forth herein. An example of a control connection is inhibition 124 control (as indicated by dashed arrows) in the pattern separation layer 100 by an inhibition control module (shown in FIG. 1 as "encode inhibition control" 126), which may be implemented by selection of a "k" (or percent of activation in the pattern separation layer 100) in a "K-Winners-Take-All" algorithm, as described by A. Yuille and D. Geiger, Winner-Take-All Mechanisms in The Handbook of Brain Theory and Neural Networks, which is hereby incorporated by reference as though fully set forth herein. Inputs 128 and 130 can be conceived of as two-dimensional patterns of data that are projected from the input layer 116, IN "A Group" component 118 and IN "B Group" component 120, to their retrospective pattern separation components 102 and 104 (i.e., a one-to-one mapping).

Learning is done on each projection between layers. Learning can be performed by any suitable method known to those skilled in the art. In a desired aspect, learning is done using a contrastive Hebbian learning method, as described Javier R. Movellan in "Contrastive Hebbian Learning in the Continuous Hopfield Model" in *Connectionist Models: Proceedings of the* 1990 *Summer School*, pgs. 10-17, 1991, which is hereby incorporated by reference as though fully set forth herein. The network settles in an expectation phase followed by an outcome phase, and then computes a simple difference of a pre- and post-synaptic activation product across these two phases. The weights are changed by some portion of this simple difference, where the portion is a learning rate parameter that can be tuned, as known to those skilled in the art, according to the needs of the application. It can be readily appreciated that too high a learning rate would cause the network to lose old memories when new memories are added.

As depicted in FIG. 1, inhibition 124 is a parameter that controls activity in the target layers (i.e., pattern separation layer 100). In image processing, this is done by histogram equalization, which is adapting the intensity distributions according to some probability distribution, a non-limiting example of which includes a Gaussian distribution. An increase in inhibition 124 can change a data distribution, such as decreasing the variance of a Gaussian distribution of pixel values. A decrease in inhibition 124 could increase variance. In this regard, the inhibition 124 is selective and affects a subpopulation of neurons that are below a threshold of activity (as opposed to global inhibition which reduces the activity of all neurons). In the present invention, a k-winners-take-all (kWTA) network is used to implement this. This method is known to those skilled in the art, and readily adapted to any particular implementation of the target pattern separation layer 100.

Figure 2:
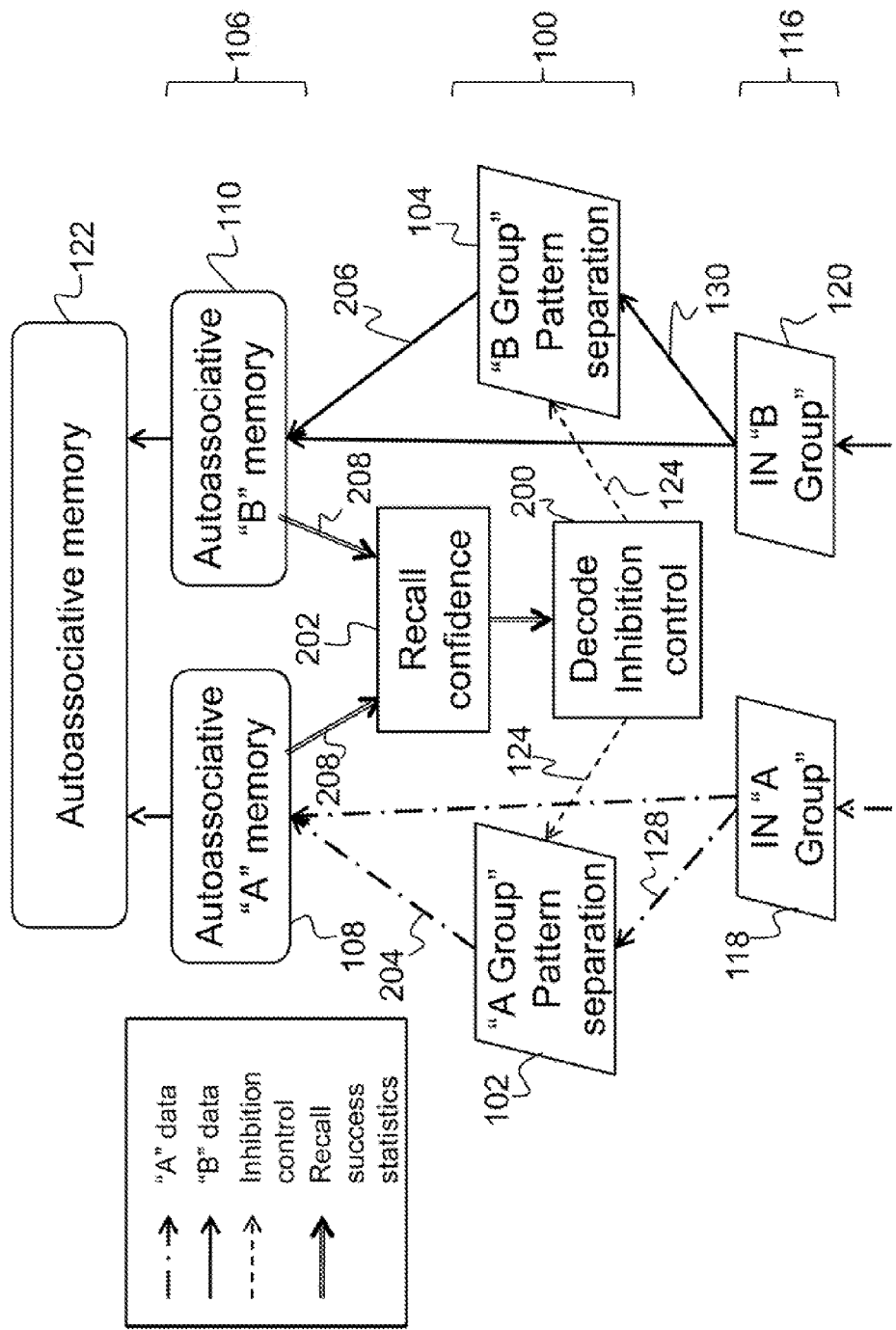
FIG. 2 is a diagram depicting use of the system for adaptive memory recall according to the present invention.

FIG. 2 is a diagram depicting the network of FIG. 1 during memory recall given a stimulus cue (i.e., new set of input data) that contains some of the features of a stored memory. Input to the inhibition control module (shown in FIG. 2 as a "decode inhibition control" 200 module to emphasize that inhibition control can operate distinctly) comes from a recall confidence module 202. As in image processing, increased contrast is used to distinguish features, and contrast is decreased to make features more uniform. In the present invention, the autoassociative memory layer 106 is supplied with one faithful copy of the inputs, together with one contrast-increased version. The goal is to supply enough contrast to sufficiently distinguish a current input from any other inputs that are expected. As shown in FIG. 2, the autoassociative "A" memory component 108 and autoassociative "B" memory component 110 each accept two inputs. The first input for each is from the input layer 116 IN (IN "A Group" component 118 and an IN "B Group" component 120), which is the original input. The second set of inputs 204 and 206 is a contrast-increased version of the original from the "A Group" pattern separation module 102 and the "B Group" pattern separation module 104 to their respective components in the autoassociative memory layer 106. Each autoassociative memory component (108 and 110) combines its inputs and stores them in the autoassociative memory 122. In a desired aspect, the inputs are combined by concatenating the representations of the autoassociative memory components (108 and 110). The inputs 128 and 130 to the pattern separation components (102 and 104) in the pattern separation layer 100 from the input layer 116 are trained during pattern storage and this enables them to similarly encode the presented cue.

In FIG. 1, "encode inhibition control" 126 is tuned based on the type of data expected. In a desired aspect, the influence of inhibition 124 is a set amount required to sufficiently distinguish between the most similar input data expected. One can envision a number of schemes for pre-processing batches of data to discover the best inhibition parameters to ensure that they can be distinguished from each other and from every other memory stored in the autoassociative memory 122. Referring to FIG. 2, one scheme is to use iterative recalls by changing the inhibition 124, storing a recall confidence metric from the recall confidence module 202 after each recall, and using an optimum inhibition level to associate with that particular memory when storing it. In those cases it would be useful (though not required) to store with each memory the inhibition control parameters used for encoding, because these parameters could be used during decoding as an initial setting for "decode inhibition control" 200. Note that iterative recalls may still be used after this recall using the initial setting, based on the recall confidence metric.

The "decode inhibition control" 200 module iteratively modulates the level of inhibition 124 of each of the pattern separation components (102 and 104) in a systematic manner, each time using a recall confidence metric of the recall confidence module 202 to decide how to proceed. One might apply various methods to assess how well a network has recalled a memory. The desired implementation of the recall confidence metric of the recall confidence module 202 is computed by a "sharpness metric", which involves averaging the activity level of the computational units in pattern separation components (102 and 104) with the highest activity. Here, pattern separation components (102 and 104) are conceived of as an array of computational units, each of which is implemented using a point neuron approximation, as described by O'Reilly & Munakata in *Computational Explorations in Cognitive Neuroscience: Understanding the Mind by Simulating the Brain*, MIT Press, pg. 103, section 3.5.3, 2000, which is hereby incorporated by reference as though fully set forth herein. That is, if the memory units are sorted by activation level, the activation levels of the K units are averaged with the highest activations, and without implying a limitation, where K in the desired implementation is 10% of the units in the autoassociative memory.

Referring to FIG. 1, when inputs are first stored, the "encode inhibition control" 126 is adjusted to provide an appropriate level of inhibition 124 to the pattern separation layer 100 to make it possible to distinguish memories. Referring to FIG. 2, when a stimulus is subsequently presented to the network, "decode inhibition control" 200 will supply that default level of inhibition to both the "A Group" pattern separation component 102 and the "B Group" pattern separation component 104. The system settles and the recall confidence metric of the recall confidence module 202 is assessed using the sharpness metric described above. If the recall confidence metric is above a threshold, the recall is successful and the outputs are considered valid. A reasonable threshold can be assessed by storing values for the recall confidence metric during storage, then testing against completely novel cues, and setting the threshold to the midpoint between the greatest activity for a novel input versus the least activity for a studied input.

On recall, if the recall confidence metric is low, the "decode inhibition control" 200 will decrease inhibition 124 by a quanta (i.e., minimum amount), and the system will be settled again. The recall confidence module 202 gets an input 208 from each autoassociative memory component (108 and 110), which is a normalized real number value representing how perfectly the IN "A Group" component 118 and the IN "B Group" component 120 inputs match the recalled memory in the autoassociative memory components (108 and 110), or "recall success statistics". The recall confidence module 202 compares these two values to a predetermined threshold, and if either is larger than the predetermined threshold, the system will send a command to "decode inhibition control" 200 to decrease inhibition on the "A Group" pattern separation component 102 and the "B Group" pattern separation component 104 corresponding to the larger of the two values. As a non-limiting example in a desired implementation, only the inhibition 124 of the "B Group" pattern separation component 104 is changed, since the goal is to recognize familiar objects (Group A) in unfamiliar surroundings (Group B). However, if the goal were to recognize familiar surroundings (Group B) with unfamiliar objects (Group A) in the scene, inhibition 124 would be reduced in the "A Group" pattern separation component 102 instead. In any case, inhibition 124 is only changed in one pattern separation component at a time. The quanta by which inhibition 124 should be changed each round will vary depending on the implementation of the pattern separation component. As a non-limiting example, one can envision changing the inhibition 124 according to an uneven schedule based on the change in the recall confidence 202 metric resulting from each change in inhibition 124, which can be learned. The desired implementation is to simply adjust inhibition 124 by a small set amount.

Figure 3:
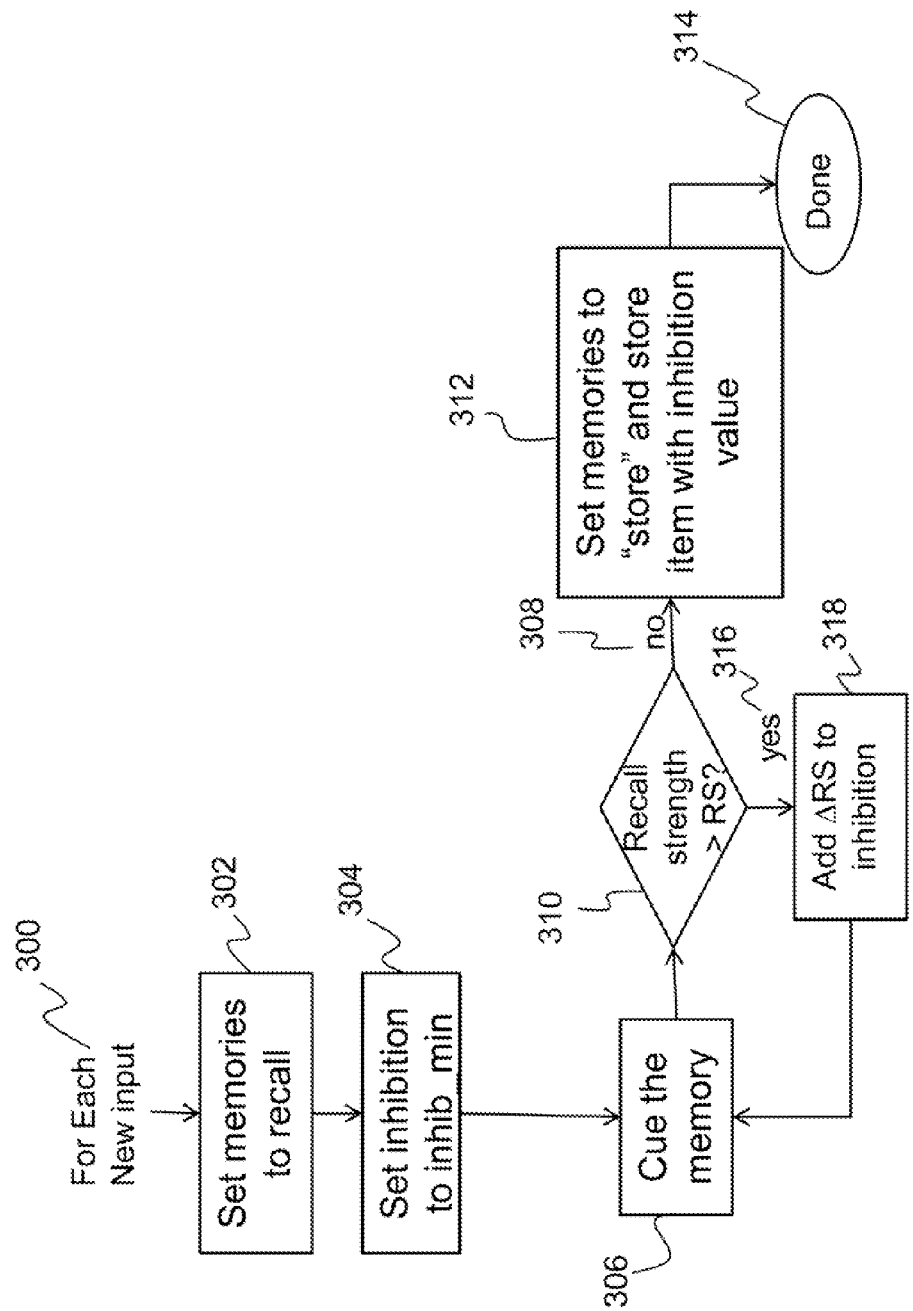
FIG. 3 is a diagram depicting encoding of inhibition control according to the present invention.

FIG. 3 illustrates a non-limiting example of "encode inhibition control". As described above, one can pre-process a batch of input data with different levels of inhibition to find a level of inhibition that will sufficiently discriminate the new inputs from anything currently contained in the autoassociative memory. The processing can occur with one input 300 at a time, as diagrammed in FIG. 3. Each autoassociative memory has a learning control signal that recalls the most similar item. If set to recall, a metric for strength of recall, or recall strength (RS), is readily applied by comparing the input cue with the resulting recalled item. The needs of the particular application and the capacity of the particular memory dictate the threshold for considering whether the item (e.g., object) is recalled or not.

One can set the autoassociative memory to recall 302 and set inhibition low (set inhibition to inhib_min 304), and then use the item to cue the memory 306. If there are no 308 recalls that exceed the requisite strength of the recall metric threshold (i.e., recall strength>RS 310), then the system sets the memory to "store" and stores the item at that level of inhibition (i.e., recording the amount of inhibition (inhibition value) with each stored item) 312, and the process is done 314. However, if something is recalled (yes 316 to recall strength>RS 310) that means that it is too similar, and the two items will interfere. Therefore, one increases the inhibition slightly by an increment delta Δ that is set again depending on the needs of the application (Add ΔRS to inhibition 318), and tries again until nothing is recalled.

Figure 4:
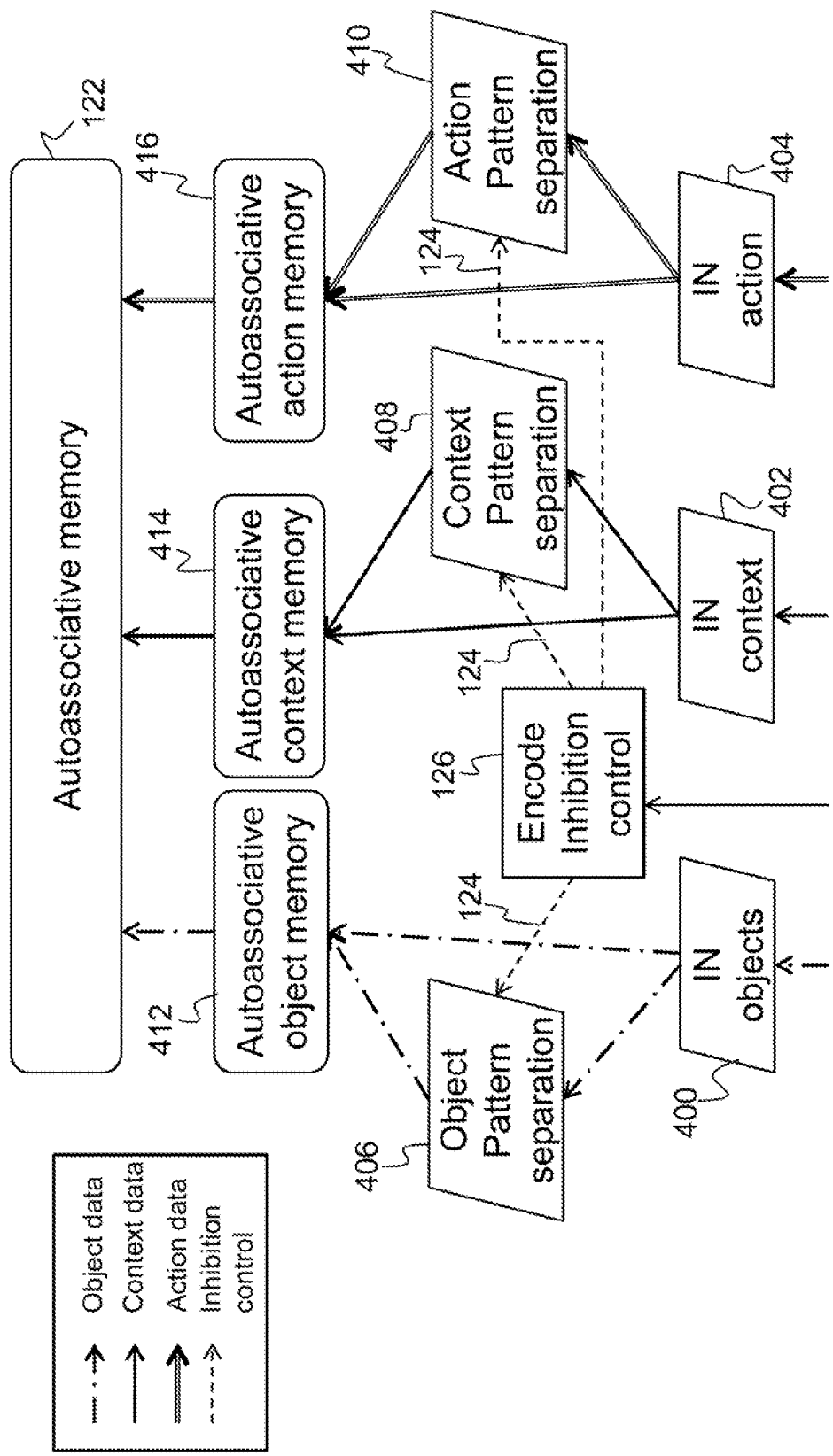
FIG. 4 is a diagram depicting a non-limiting example of an application of the system for adaptive memory recall according to the present invention.

A variation of the system for adaptive memory recall is presented in FIG. 4. The modules were adapted to address the needs of an autonomous robot. New environments can be imposed by disasters which reorganize the landscape in drastic ways, and the system still needs to perform perception and action. If the system can recognize a familiar grouping of percepts (e.g., objects), even in a novel context, it can respond with the appropriate action. The input in FIG. 4 comprises objects data input 400, context data input 402, and action data input 404. The objects data input 400 is received by an object pattern separation module 406, the context data input 402 is received by a context pattern separation module 408, and the action data input 404 is received by an action pattern separation module 410. Each of these pattern separation modules are comparable to the pattern separation modules described in FIGS. 1 and 2. The only difference is the type of data they handle (i.e., object vs. context vs. action). In this example, the "encode inhibition control" 126 module controls inhibition 124 of the object pattern separation module 406, the context pattern separation module 408, and the action pattern separation module 410. Each set of data input (e.g., objects data input 400, context data input 402, and action data input 404) is sent to a pattern separation module, as described, and also sent directly to a corresponding autoassociative memory module. For instance, objects data input 400 is sent to an autoassociative object memory module 412, context data input 402 is sent to an autoassociative context memory module 414, and action data input 404 is sent to an autoassociative action memory module 416. Furthermore, as in the examples described above, each of the pattern separation modules in FIG. 4 sends a contrast-increased version of the original input data to its respective autoassociative context memory module (e.g., autoassociative object memory module 412, autoassociative context memory module 414, and autoassociative action memory module 416). All of the specific autoassociative context memory modules described are then combined in the autoassociative memory 122.

Figure 5:
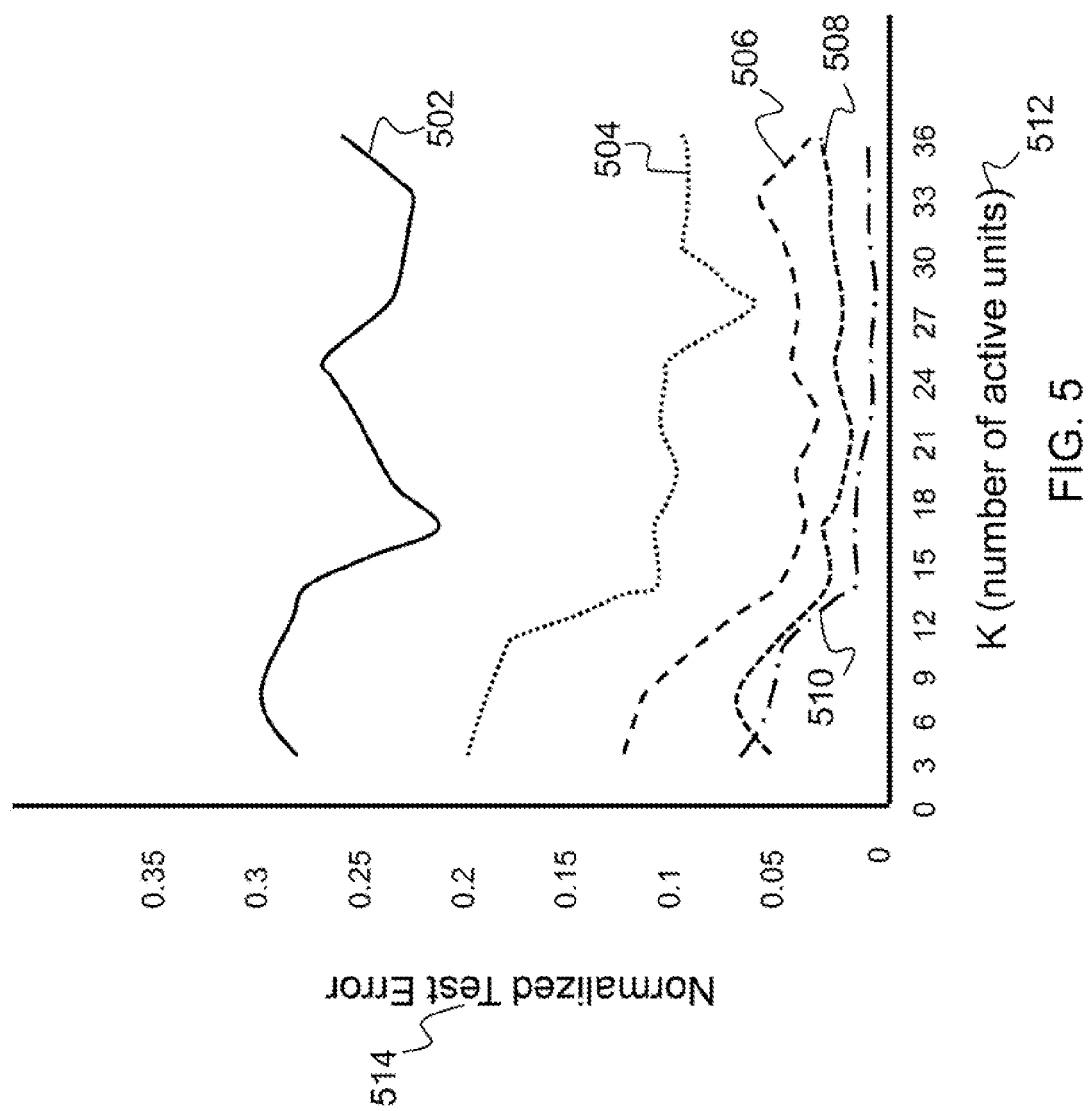
FIG. 5 is a plot of results from a test performed with the adaptive memory recall system according to the present invention.

FIG. 5 is a plot 500 depicting the results of a pilot study performed with the adaptive memory recall system described herein. The pilot study is described in detail by Howard et al. in "Adaptive Recall in Hippocampus", Frontiers in Artificial Intelligence and Applications, Vol. 233: Biologically Inspired Cognitive Architectures, pgs. 151-157, 201, which is hereby incorporated by reference as though fully set forth herein. In summary, training data was presented in ten trials, each trial consisting of an associated between an A pattern in lateral with a B pattern. On a medial side, each trial had a characteristic context pattern labeled C. These patterns can be considered sigmoidally thresholded neural activations caused by perceiving certain objects in the environment. In each training epoch, every trial was presented once, and the weights were adjusted. This continued until the error was reduced to nearly zero. Then, the trained network was tested by presenting every trial again, but with the B pattern blanked out on the lateral side, and zero to four of the six slots of the medial side context replaced by random noise. The task was to pattern-complete the blank lateral B column and repair the noise on the medial side.

The system was tested using inputs with five varying levels of noise, which are the five lines in the plot, labeled as zero noise 502 (no noise), noise level one 504, noise level two 506, noise level three 508, and noise level four 510. Along the x-axis is K (number of active units) 512, and along the y-axis is normalized test error 514. As shown in the plot 500, as inhibition is decreased (i.e., larger number of active units), testing error is reduced, and an optimal level (e.g., a value of K 512 corresponding to the lowest normalized test error 514) can be found depending on the stimulus dimensions (e.g., the noise level).

Figure 6:
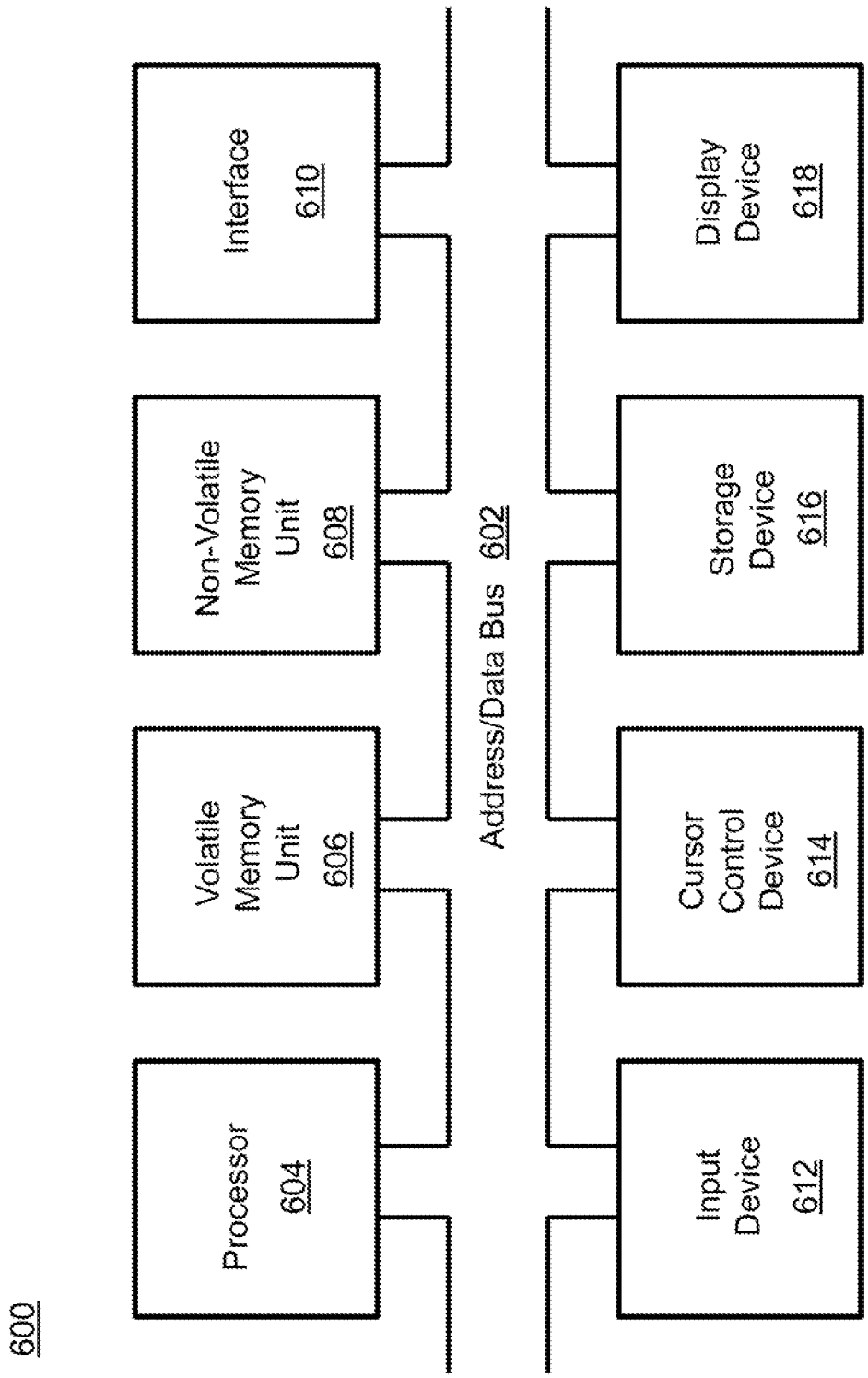
FIG. 6 is an illustration of a data processing system according to the present invention.

An example of a computer system 600 in accordance with one aspect is shown in FIG. 6. The computer system 600 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 600. When executed, the instructions cause the computer system 600 to perform specific actions and exhibit specific behavior, such as described herein.

The computer system 600 may include an address/data bus 602 that is configured to communicate information. Additionally, one or more data processing units, such as a processor 604, are coupled with the address/data bus 602. The processor 604 is configured to process information and instructions. In one aspect, the processor 604 is a microprocessor. Alternatively, the processor 604 may be a different type of processor such as a parallel processor, or a field programmable gate array.

The computer system 600 is configured to utilize one or more data storage units. The computer system 600 may include a volatile memory unit 606 (e.g., random access memory ("RAM"), static RAM, dynamic RAM, etc.) coupled with the address/data bus 602, wherein a volatile memory unit 606 is configured to store information and instructions for the processor 604. The computer system 600 further may include a non-volatile memory unit 608 (e.g., read-only memory ("ROM"), programmable ROM ("PROM"), erasable programmable ROM ("EPROM"), electrically erasable programmable ROM "EEPROM"), flash memory, etc.) coupled with the address/data bus 602, wherein the non-volatile memory unit 608 is configured to store static information and instructions for the processor 604. Alternatively, the computer system 600 may execute instructions retrieved from an online data storage unit such as in "Cloud" computing. In one aspect, the computer system 600 also may include one or more interfaces, such as an interface 610, coupled with the address/data bus 602. The one or more interfaces are configured to enable the computer system 600 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 600 may include an input device 612 coupled with the address/data bus 602, wherein the input device 612 is configured to communicate information and command selections to the processor 600. In accordance with one aspect, the input device 612 is an alphanumeric input device, such as a keyboard, that may include alphanumeric and/or function keys. Alternatively, the input device 612 may be an input device other than an alphanumeric input device. In one aspect, the computer system 600 may include a cursor control device 614 coupled with the address/data bus 602, wherein the cursor control device 614 is configured to communicate user input information and/or command selections to the processor 600. In one aspect, the cursor control device 614 is implemented using a device such as a mouse, a track-ball, a track-pad, an optical tracking device, or a touch screen. The foregoing notwithstanding, in one aspect, the cursor control device 614 is directed and/or activated via input from the input device 612, such as in response to the use of special keys and key sequence commands associated with the input device 612. In an alternative aspect, the cursor control device 614 is configured to be directed or guided by voice commands.

In one aspect, the computer system 600 further may include one or more optional computer usable data storage devices, such as a storage device 616, coupled with the address/data bus 602. The storage device 616 is configured to store information and/or computer executable instructions. In one aspect, the storage device 616 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 618 is coupled with the address/data bus 602, wherein the display device 618 is configured to display video and/or graphics. In one aspect, the display device 618 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 600 presented herein is an example computing environment in accordance with one aspect. However, the non-limiting example of the computer system 600 is not strictly limited to being a computer system. For example, one aspect provides that the computer system 600 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 7:
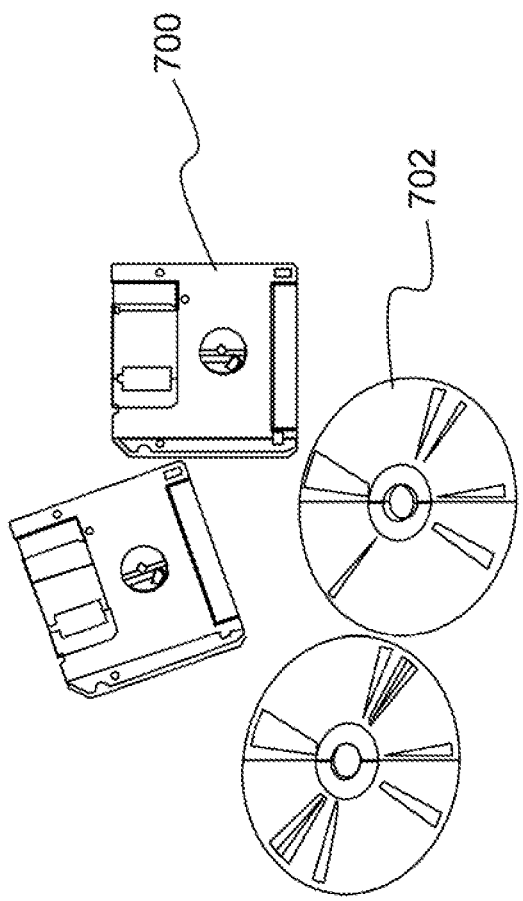
FIG. 7 is an illustration of a computer program product according to the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program product generally represents computer readable code (i.e., instruction means or instructions) stored on any compatible non-transitory computer readable medium.

What is claimed is:

1. A system for adaptive memory recall, the system comprising:
   one or more processors and a memory having instructions such that when the instructions are executed, the one or more processors perform operations of:
   receiving a set of original input data;
   dividing the set of original input data into a plurality of data groups to serve as input for a network comprising a pattern separation layer and an autoassociative memory layer, wherein the pattern separation layer comprises a plurality of pattern separation components and the autoassociative memory layer comprises a plurality of autoassociative memory components;
   for each data group, processing of the original input data with a distinct pattern separation component of the pattern separation layer, wherein each pattern separation component generates an increased-contrast version of the original input data it processes;
   for each data group, combining the generated increased-contrast version of the original input data from the pattern separation layer with the original input data, resulting in combined input data; and
   for each data group, storing the combined input data in a distinct autoassociative memory component, resulting in stored data.

2. The system as set forth in claim 1, wherein the one or more processors further perform operations of:
   receiving a new set of input data; and
   modulating at least one parameter that controls processing in the pattern separation layer to determine at least one optimal parameter, wherein if the at least one optimal parameter is determined, then a memory recall between the stored data and the new set of input data is achieved.

3. The system as set forth in claim 2, wherein if the at least one optimal parameter is not determined, then the new set of input data is learned by the system.

4. The system as set forth in claim 2, wherein the at least one parameter is an inhibition parameter, wherein the inhibition parameter inhibits processing in the pattern separation layer, such that inhibition of processing decreases contrast in the generated increased-contrast version of the original input data.

5. The system as set forth in claim 4, wherein each inhibition parameter inhibits processing in a distinct pattern separation component, and wherein each inhibition parameter is modulated independently.

6. The system as set forth in claim 4, wherein the one or more processors further perform an operation of iteratively modulating the inhibition parameter using a recall confidence metric, wherein if the recall confidence metric is above a predetermined threshold, then the memory recall is achieved, and wherein if the recall confidence metric is below a predetermined threshold, then inhibition is decreased.

7. The system as set forth in claim 1, wherein the plurality of data groups comprises an object data group and a context data group.

8. A computer-implemented method for adaptive memory recall, comprising:
   an act of causing a data processor to execute instructions stored on a non-transitory memory such that upon execution, the data processor performs operations of:
   receiving a set of original input data;
   dividing the set of original input data into a plurality of data groups to serve as input for a network comprising a pattern separation layer and an autoassociative memory layer, wherein the pattern separation layer comprises a plurality of pattern separation components and the autoassociative memory layer comprises a plurality of autoassociative memory components;
   for each data group, processing of the original input data with a distinct pattern separation component of the pattern separation layer, wherein each pattern separation component generates an increased-contrast version of the original input data it processes;
   for each data group, combining the generated increased-contrast version of the original input data from the pattern separation layer with the original input data, resulting in combined input data; and for each data group, storing the combined input data in a distinct autoassociative memory component, resulting in stored data.

9. The method as set forth in claim 8, wherein the data processor further performs operations of:
receiving a new set of input data; and
modulating at least one parameter that controls processing in the pattern separation layer to determine at least one optimal parameter, wherein if the at least one optimal parameter is determined, then a memory recall between the stored data and the new set of input data is achieved.

10. The method as set forth in claim 9, wherein if the at least one optimal parameter is not determined, then the new set of input data is learned by the system.

11. The method as set forth in claim 9, wherein the at least one parameter is an inhibition parameter, wherein the inhibition parameter inhibits processing in the pattern separation layer, such that inhibition of processing decreases contrast in the generated increased-contrast version of the original input data.

12. The method as set forth in claim 11, wherein each inhibition parameter inhibits processing in a distinct pattern separation component, and wherein each inhibition parameter is modulated independently.

13. The method as set forth in claim 11, further comprising an act of causing a data processor to perform an operation of iteratively modulating the inhibition parameter using a recall confidence metric, wherein if the recall confidence metric is above a predetermined threshold, then the memory recall is achieved, and wherein if the recall confidence metric is below a predetermined threshold, then inhibition is decreased.

14. The method as set forth in claim 8, wherein the plurality of data groups comprises an object data group and a context data group.

15. A computer program product for adaptive memory recall, the computer program product comprising instructions stored on a non-transitory computer-readable medium that are executable by a computer having a processor for causing the processor to perform operations of:
receiving a set of original input data;
dividing the set of original input data into a plurality of data groups to serve as input for a network comprising a pattern separation layer and an autoassociative memory layer, wherein the pattern separation layer comprises a plurality of pattern separation components and the autoassociative memory layer comprises a plurality of autoassociative memory components;
for each data group, processing of the original input data with a distinct pattern separation component of the pattern separation layer, wherein each pattern separation component generates an increased-contrast version of the original input data it processes;
for each data group, combining the generated increased-contrast version of the original input data from the pattern separation layer with the original input data, resulting in combined input data; and
for each data group, storing the combined input data in a distinct autoassociative memory component, resulting in stored data.

16. The computer program product as set forth in claim 15, further comprising instructions for causing the processor to perform operations of:
receiving a new set of input data; and
modulating at least one parameter that controls processing in the pattern separation layer to determine at least one optimal parameter, wherein if the at least one optimal parameter is determined, then a memory recall between the stored data and the new set of input data is achieved.

17. The computer program product as set forth in claim 16, wherein if the at least one optimal parameter is not determined, then the new set of input data is learned by the system.

18. The computer program product as set forth in claim 16, wherein the at least one parameter is an inhibition parameter, wherein the inhibition parameter inhibits processing in the pattern separation layer, such that inhibition of processing decreases contrast in the generated increased-contrast version of the original input data.

19. The computer program product as set forth in claim 18, wherein each inhibition parameter inhibits processing in a distinct pattern separation component, and wherein each inhibition parameter is modulated independently.

20. The computer program product as set forth in claim 18, further comprising instructions for causing the data processor to perform an operation of iteratively modulating the inhibition parameter using a recall confidence metric, wherein if the recall confidence metric is above a predetermined threshold, then the memory recall is achieved, and wherein if the recall confidence metric is below a predetermined threshold, then inhibition is decreased.

21. The computer program product as set forth in claim 15, wherein the plurality of data groups comprises an object data group and a context data group.

* * * * *